3,374,266
PREPARATION OF ACRYLIC ACID ESTERS
Theodor Volker, Fribourg, Switzerland, assignor to
Lonza Ltd., Basel, Switzerland
No Drawing. Continuation-in-part of application Ser. No. 481,072, Aug. 19, 1965. This application June 21, 1967, Ser. No. 647,634
Claims priority, application Switzerland, Mar. 6, 1963, 2,925/63; Sept. 1, 1964, 11,416/64
10 Claims. (Cl. 260—486)

ABSTRACT OF THE DISCLOSURE

Acrylic acid esters are prepared by decarboxylation of a mono copper salt of a 1,2-ethylenedicarboxylic acid in the presence of pyridine, quinoline, or acridines and preferably also of an acrylic acid ester and an alcohol.

---

This application is a continuation-in-part of applications Ser. No. 348,873, filed Mar. 2, 1964, and 481,072, filed Aug. 19, 1965 now abandoned.

This invention relates to the preparation of acrylic acid esters.

I have found that acrylic acid esters can be produced smoothly and in excellent yields if instead of 1,2-ethylene dicarboxylic acid half esters their mono-copper salts are decarboxylated in the temperature range of 100 to 290° C. in the presence of a heterocyclic compound of aromatic character containing a trivalent nitrogen atom, all three valences of which are linked to atoms within the ring. These compounds will be called hereafter "pyridine type" compounds.

As mono-copper salts of 1,2-ethylene dicarboxylic acid half esters, I may use salts of monovalent as well as of bivalent copper which contain one atom of copper per mole of half ester of the formula R-Cu or R-CuOH, in which R represents the 1,2-ethylene dicarboxylic acid half ester moiety.

Suitable 1,2-ethylene dicarboxylic acid half ester moieties of the copper salts are, preferably these of maleic acid monoesters having 1–4 carbon atoms in the aliphatic alcohol radical; however also such other maleic acid monoesters which contain in the primary and secondary alcohol radicals 4 to 10 carbon atoms, such as maleic acid monocyclohexyl ester, maleic acid monobenzyl ester and the corresponding fumaric acid monoesters, may be used.

The mono-copper salts to be subjected to decarboxylation are readily prepared before or in situ during the reaction from copper compounds and the 1,2-ethylene dicarboxylic acid half esters. Suitable mono- or bivalent copper compounds are, for instance, copper (I) oxide, copper (II) oxide, basic copper carbonate, copper sulfide, copper acetonyl acetonate. If the copper salt is formed in situ during the reaction, care has to be taken that the 1,2-ethylene dicarboxylic acid half ester is introduced into the reaction medium at such a rate that the copper compounds are always present in excess to the introduced half ester. Such excess is preferably of 0.1 to 10 mole percent with respect to the present 1,2-ethylene dicarboxylic acid half ester.

The presence of a pyridine type compound is critical because such compounds increase considerably the rate of decarboxylation. Examples of such compounds are, for instance, pyridine, quinoline, and acridines. Similar compounds not satisfying all the recited conditions have very small effects. For instance, pyrrole, which is also an N-heterocyclic compound of aromatic character but contains the N bonded only with two valences within the ring, acts very little as a reaction accelerator; neither does the aromatic compound triphenylamine, which is a tertiary amine containing trivalent nitrogen but not as member of a ring. The pyridine type compound is used in a molar ratio of at least 1 to 10 with respect to the mono-copper salt of the 1,2-ethylene dicarboxylic half ester. There is no critical upper limit especially than when the pyridine type compound is used as a solvent for the reaction other than that given by the inherent setbacks due to excessive dilution well known to those acquainted with the chemical art.

The addition of compounds having an alkaline reaction in water, e.g. NaOH, $CaCO_3$, can improve the conversion rate.

The process of the invention is carried out in the temperature range of 100 to 290° C. The lower limit is defined by the decrease of the rate of reaction, the upper limit is determined by the instability of the 1,2-ethylene dicarboxylic acid half esters or the oxygen-copper compound.

According to a modification of the invention, the reaction may be carried out in the presence of a solvent which is inert and miscible with the heterocyclic N-compound accelerator. Suitable solvents are higher hydrocarbons, high boiling esters, ketones, ethers, and tertiary amines other than such of the pyridine type. Specific examples are phthalic esters, polysiloxanes, higher essential oils and mineral oil fractions, mixtures of diphenyl and diphenyl oxide, tetra- and hexaethylene-glycol diethers, dimethylformamide.

In order to oppose a possible split of the half esters or acrylic esters into anhydride and alcohol it is further expedient to employ the alcohol in four to five times the molar ratio with respect to the acrylic esters to be formed as reaction medium. If other solvents than alcohols are used, the latter may be employed additionally in form of a solvent mixture with said other solvents.

If alcohols or esters are employed as solvents, it is of advantage to use those compounds which correspond to the ester group of the half ester compounds and of the acrylic esters to be formed.

It is recommended to employ polymerization inhibitors which may be volatile or non-volatile under the reaction conditions, such as hydroquinone, pyrocatechol, indulin, methylene blue, hydroquinone ethers, phenothiazine, alone or in mixture with each other to prevent the polymerization of the ethylenically unsaturated compounds.

According to a further embodiment of the invention, reaction products containing up to 95% and more of acrylic acid ester may be obtained when the decarboxylation is carried out in the presence of acrylic acid esters and small amounts of alcohol. The amounts employed are 2–65, preferably 5–25 parts by weight of acrylic acid ester, calculated on the free half ester, and 0.01–2.0, preferably 0.02–0.5 moles of an alcohol, calculated on 1 mole of the free half ester. Preferably, an acrylic acid ester and an alcohol are used which correspond to the half ester compound. For instance, in the decarboxylation of monoethyl maleate, ethyl acrylcate and ethanol will be employed as additives.

It is of advantage to add the acrylic acid esters and corresponding alcohols in an indirect manner by using in the preparation of the 1,2-ethylenedicarboxylic acid half esters by reaction of a dicarboxylic acid anhydride, e.g. maleic anhydride, with alcohols already the desired excess of alcohol and adding the acrylic acid ester in the proportions recited above. Particularly suitable for this purpose are azeotropic mixtures of the alcohol and acrylic acid ester, which mostly consist of about 70–80% by weight of alcohol and 30–20% of the acrylic acid ester. Such azeotropic mixtures are obtained in many preparation and conversion methods of the acrylates such as esterification and transesterification reactions.

3

This modification presents the following advantages:

(a) A smaller excess of alcohol is required. For instance, in the production of ethyl acrylate, the total amount of the reaction mixture can be reduced by about 70%, calculated on 1 mole of dicarboxylic acid half ester.

(b) As a result of (a), the maximum rate of passing through the apparatus, calculated per 1 mole of dicarboxylic acid half ester, can be increased about 4 times.

(c) Instead of the about 25–40% acrylic acid ester solutions in alcohol obtained as reaction product in the previous procedure, mixtures containing up to 95% and more of acrylic acid ester are directly obtained. Said reaction products can be directly separated by simple distillation operations, without addition of additional separating agents such as water, into a small proportion of azeotrope, which can be re-used, and pure acrylic ester. The reaction mixture can be continuously fractionated in conventional tray columns; therefore, simple apparatus can be used for the continuous production of pure acrylic acid esters. If polymerization reactions are excluded, the procedure operates without any losses; no drying is required.

The following examples are given to illustrate the invention.

*Example 1.—Preparation of acrylic acid methyl ester by continuous decarboxylation of the monovalent copper salt of monomethyl maleate*

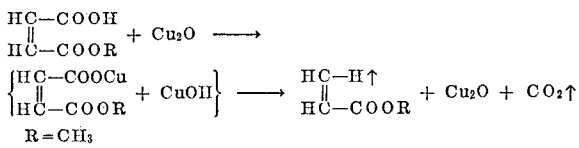

R = CH₃

The apparatus was a 500 ml. four neck round-bottom flask equipped with a deeply immersed dropping funnel, thermometer, stirrer, and a lateral 20 cm. long packed column. The column was connected to a conventional distillation apparatus consisting of an adjustable head with reflux cooler, a sloping coil condenser, a graduated receiver, a condenser with attached cold trap (−70° C.) and finally with a CO₂-absorption vessel filled with 33% KOH.

180 g. of quinoline, 14.3 g. of CuO (0.1 mole), and 1 g. of indulin as polymerization inhibitor were placed into the four neck flask. The mixture was heated with stirring at 220° C., and a solution of 1 mole of monomethyl maleate in 5 moles of methanol was introduced from the dropping funnel into the stirred solution at a rate of 0.19 mole/hour of monomethyl maleate. A mixture of acrylic acid methyl ester and methanol distilled off through the column in a steady current of CO₂ at a temperature of 59° C. After 74 g. (0.57 mole) of monomethyl maleate had been charged, the reaction was discontinued. The yield, calculated from the total absorbed CO₂ amount (23.8 g.), was about 95 percent of theory. The distillate contained 40.9 g. of acrylic acid methyl ester, corresponding to a yield of 83.4%.

On increase of the Cu₂O amount, the rate of decarboxylation was further increased (quantitative conversion), and the yield of acrylate rose to more than 90 percent of theory. The Cu₂O recovered at the end of the reaction can be reused for a further reaction according to the invention.

*Example 2.—Preparation of acrylic acid ethyl ester by continuous decarboxylation of the monovalent copper salt of monoethyl maleate*

The equation of the reaction is similar to that in Example 1, R being C₂H₅.

The reaction was carried out in the apparatus described in Example 1. Under the reaction conditions set forth therein, the same amount of reaction medium 14.3 g. (0.1 mole) of Cu₂O in 250 g. of quinoline with 2 g. of indulin

4 was used, and 79 g. of monoethyl maleate in 127 g. (2.75 moles) of ethanol was introduced. The conversion was 93.7% of theory, and acrylic acid ethyl ester was recovered in a yield of 84.75%. The Cu₂O could be recovered substantially entirely after the reaction.

*Example 3.—Preparation of acrylic acid butyl ester by continuous decarboxylation of the monovalent copper salt of monobutyl maleate*

The equation of the reaction is similar to that of Example 1, R being C₄H₉.

Compared with the glass apparatus described in Example 1, the following parts were larger: Four-neck round bottom flask of 1 liter capacity, and a column of 35 cm.

The four neck flask was filled with 250 g. of quinoline, 14.3 g. of Cu₂O (0.1 mole), 0.56 g. of KOH (0.01 mole), and with 2 g. of indulin and 1 g. of pyrocatechol as polymerization inhibitors. The charge was heated with stirring at 223° C. At the start, and at the end, of the reactions, 35 g. each of n-butanol were passed through the apparatus. 172 g. monobutyl maleate dissolved in 296 g. (4 moles) of butanol were decarboxylated. The rate of flow was 77.2 g. (0.45 mole) of maleate per hour. The reaction product, a butanol solution of butyl acrylate, was withdrawn under slight reflux.

The distillate contained 119.5 g. of acrylic acid butyl ester, corresponding to a yield of 93.5 percent of theory. From the amount of split-off CO₂, a conversion of also 93.5% was calculated; the yield, calculated on conversion, was therefore quantitative (100%). No oxidation products (butyraldehyde) could be found in the distillate; in agreement therewith, the Cu₂O was completely recovered after the reaction.

In a similar test using the lower rate of flow of 64 g. (0.37 mole) of maleate per hour, substantially quantitative conversion and yield of acrylate were obtained.

*Example 4.—Acrylic acid methyl ester preparations by continuous decarboxylation of basis copper (II) salts of monomethyl maleate at temperatures of 100° C. and above*

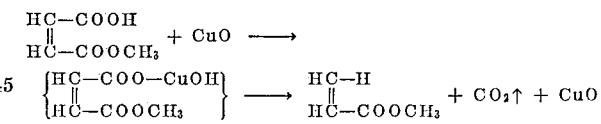

The apparatus was the same as described in Example 1.

The four neck flask was filled for each test with 8.7 g. of CuO (0.11 mole) and with 0.2 g. of indulin and methylene blue as stabilizers. The reaction media employed for four separate different tests were 200 g. each of (A) dimethyl formamide (DMF).
(B) a mixture of 95% of DMF and 5% of pyridine.
(C) a mixture of 75% of DMF and 25% of pyridine.
(D) pyridine alone.

In each test, the reaction medium was heated to gentle boiling, tests A and B at 152° C., test C at 130° C., and test D at about 100° C. In each test, 80 g. (0.615 mole) of a monomethyl maleate solution in five times the molar amount of methanol were fed over one hour into the reaction medium.

In test A, i.e. in pure dimethyl formamide, no decarboxylation took place because at 152° C. in the absence of the pyridine type compound the temperature was not sufficient.

In test B, i.e. after addition of 5% of pyridine, a conversion of 57% was obtained after the same working time than in test A, and the acrylic acid ester was recovered in a yield of 53.4%. The conversion rate increased by slowing the rate of flow. The yield of acrylic ester, calculated on conversion, was, therefore, 93.6%.

In test C, at 130° C., the conversion was 40% after the same working time than in test A; the acrylate yield, calculated on the conversion, was 52.3%. As in test B the conversion was increased when slowing the rate of flow.

Test D, i.e. operation at 100° C., produced a conversion of 31.4% and an acrylate yield, calculated on said conversion, of 24%. On slowing, the rate of flow conversion of 87% was obtained.

When comparing the tests A, B, C and D it is to keep in mind that by decreasing the reaction temperature also the reaction velocity decreases; however they show that the pyridine type compound allows decarboxylation in good yields at very low temperatures for this kind of reaction.

In the residue, the acrylate was present mostly in polymeric chloroform-soluble form. In addition, a crystalline compound could be recovered which according to its composition could have been produced by addition of 1 mole of pyridine to 1 mole of maleic anhydride or monomethyl maleate.

*Example 5*

The decarboxylation of a solution of 29.6 g. (0.228 mole) of monomethyl maleate in 1.14 moles of methanol, when passed per hour through a slurry of 14.3 g. of CuO in 171.7 g. of dimethyl formamide and 8.3 g. of pyridine at a reaction temperature of 150° C., resulted at a conversion of about 35% in the yield of recovered acrylate of 34.7%. Calculated on conversion, said yield was practically quantitative. At a slower rate of flow, the conversion could be increased.

*Example 6*

A supply of a solution of monomethyl maleate in five times the molar amount of methanol was prepared and stabilized with 0.05% of hydroquinone. Said solution was passed into a bath liquid consisting of 7.95 g. of CuO + 172 g. of quinoline (+ 0.5 g. of indulin as inhibitor) through a metering funnel immersed 4 cm. into the bath. The bath liquid was continuously stirred and externally heated at 221 to 223 ($\pm$ 5° C.). The distilling of reaction product was passed through a packed column of 15 cm. length and subjected to a coarse condensation at a Claison bridge and in a sloping spherical cooler. The uncondensed gases were passed through a cold trap cooled at $-70$ to $-80°$ C. into a $CO_2$-absorption flask filled with 15% NaOH. The average rate of feed of the monomaleate solution was 1.5 to 2 drops/sec. After each passage of 153 g. of solution (about 165 ml.), the yield of acrylic acid methyl ester was determined and the conversion was calculated from the split-off $CO_2$. In all passages, 23.2 to 23.3 g. of $CO_2$ were determined, which corresponded exactly to the optimum values which could be expected (99–100%). The yields of acrylate (calculated from determination of the saponification and bromine numbers) were 86.6% for the first passage, then chronologically 93.4%, 98%, 99%, 97%, 99% and 99.7% of theory. After discontinuing the test series, the same bath liquid could be used again several days later without decrease of its activity; due to a small precipitation of polymers, the weight of the bath liquid increased by 3.3 g.

*Example 7*

79.5 g. CuO and 130 g. monomethyl maleate were introduced in 64 g. methanol. The copper salt of the monomethyl maleate thus obtained was mixed with 820.5 g. chinoline. This mixture was heated under stirring. At 90° C. the decarboxylation started, and the decarboxylation speed increased rapidly at temperature of 120° C. The conversion rate was found to be above 80%.

*Example 8*

The decarboxylation of a solution of 29.6 g. (0.228 moles) of monomethyl fumarate in 1.14 moles of methanol, when passed per hour through a slurry of 14.3 g. of CuO in 171.7 g. of dimethyl formamide and 8.3 g. of pyridine at a reaction temperature of 150° C., resulted at a conversion of about 35% in the yield of recovered acrylate of 34.7%. Calculated on conversion, said yield was practically quantitative. At a slower rate of flow, the conversion could be increased.

*Examples 9–11*

Decarboxylation of monoethyl maleate in form of the Cu (I) salts in quinoline at 200–218° C. in the presence of varying excesses of ethanol and in the presence of additional acrylic acid ethyl ester.

APPARATUS

The apparatus used was a 1000 ml. four-neck flask equipped with stirrer (160 r.p.m.), thermometer, metering funnel with long outlet tube dipping into the bath liquid, a 35 cm. long packed column provided with adjustable head, gas pressure compensation line (for formed $CO_2$), and an intense cooler inclined towards a graduated condenser. The waste gases were passed through two cold traps cooled at $-80°$ C. into a $CO_2$ absorption vessel filled with about 35% potassium hydroxide solution.

BATH LIQUID (REACTION MEDIUM)

There were introduced into the four-neck flask, with agitation: 300 g. of quinoline, 42.9 g. $CuO_2$, as catalysts; 0.3 of pyrocatechol as polymerization inhibitor.

PREPARATION OF THE MONOETHYL MALEATE SOLUTIONS

By mixing 70 parts by weight of ethanol and 30 parts by weight of acrylic acid ethyl ester, a solution of approximately azeotropic composition, designated hereafter "azeotrope," was prepared and employed for the reaction with maleic anhydride for examples 9 to 11.

1 mole of maleic anhydride ($=$98 g.) each was reacted at a temperature of about 50 to 75° C. within 40 minutes with the following amounts of "azeotrope" (the mole amounts correspond to the ethanol content), or ethanol to form clear yellowish maleate solutions:

Example 9: 3 moles of "azeotrope," i.e. 197.0 g.
Example 10: 1.5 moles of "azeotrope," i.e. 98.6 g.
Example 11: 1.1 moles of "azeotrope," i.e. 72.3 g.

After the formation of monoethyl maleate had been completed, the solutions had the following compositions in percentages by weight:

Example 9: Monoethyl maleate 48.8%; ethanol 31.2% ($=$2 moles); acrylic acid ethyl ester 20.0% ($=$41% calculated on 100% maleate).
Example 10: Monoethyl maleate 73.3%; ethanol 11.7% ($=$0.5 mole); acrylic acid ethyl ester 15% ($=$20.5% calculated on 100% maleate).
Example 11: Monoethyl maleate 84.5%; ethanol 2.7% ($=$0.1 mole); acrylic acid ethyl ester 12.8% ($=$15.2% calculated on 100% maleate).

PROCEDURE

The reaction medium was heated with stirring to the temperatures given below and was, prior and after the decarboxylation, rinsed each time with 25 g. of ethanol to avoid adsorption losses. Subsequently, the maleate solutions were forced steadily at the following rates in moles per hour into the reaction medium:

Example 9: 0.75 mole/hour
Example 10: 0.75 mole/hour
Example 11: 1.98 mole/hour

The reaction temperature in Examples 9 and 10 was 215–218° C.; in Example 11, which was carried out at a much faster rate, only 209–210° C. could be maintained.

The reaction products were withdrawn under gentle reflux, and the liquid components were separated in the condenser and cold traps. The carbon dioxide was absorbed; the $CO_2$ dissolved in the cold traps was, after termination of the test, also distilled into the absorption vessel, and the conversion was calculated from the increase in weight (44 g. $CO_2$=100% of theory).

The liquid reaction products consisted of acrylic acid ethyl ester and ethanol and contained small traces of acetaldehyde. The contents of acrylic acid ethyl ester were:

Example 9: 63.3%
Example 10: 83.6%
Example 11: 95.8%

Regarding conversion and yields of acrylic acid ester (taking into account the amounts of added ester) are summarized in the following table:

TABLE

| Example | Conversion calc. from $CO_2$, percent of theory | Yield AAeE | | Loss of AAeE | |
|---|---|---|---|---|---|
| | | In g. | In percent of theory | In g. | In percent of theory |
| 9 | 96.8 | 150.0 | 94.1 | 9.3 | 5.9 |
| 10 | 98.7 | 119.4 | 92.9 | 10.25 | 7.1 |
| 11 | 100.1 | 112.8 | 92.8 | 9.9 | 7.2 |

AAeE=Acrylic acid ethyl ester.

*Examples 12–14*

Decarboxylation of monoethyl maleate as Cu (II) salt in quinoline at 215° C. in the presence of varying excesses of ethanol and in presence of added acrylic acid ethyl ester.

APPARATUS

See Examples 9–11.

REACTION MEDIUM (BATH LIQUID)

300 g. of quinoline, 59.2 CuO, and 0.3 g. of pyrocatechol.

MONOETHYL MALEATE SOLUTIONS

For Example 12, the preparation was as for Example 9; for Example 13 as for Example 10, and for Example 14 as for Example 11.

PROCEDURE

See Examples 9–11.

RESULTS

The conversions and yields are listed below.
The contents of acrylic acid ester were:

Example 12: 63.8%
Example 13: 84.3%
Example 14: 96.3%

TABLE

| Example | Conversion calc. from $CO_2$, percent of theory | Yield AAeE | | Loss of AAeE | |
|---|---|---|---|---|---|
| | | In g. | In percent of theory | In g. | In percent of theory |
| 12 | 97.2 | 153.2 | 96.2 | 6.1 | 3.8 |
| 13 | 99.1 | 122.5 | 94.6 | 7.1 | 5.4 |
| 14 | 99.9 | 120.2 | 98.9 | 1.5 | 1.1 |

AAeE=Acrylic acid ethyl ester.

*Example 15*

Decarboxylation of monoethyl maleate as Cu (II) salt at reduced temperatures (100–152° C.).

If, in the reaction medium, the 300 g. of quinoline are replaced by 300 g. of pyridine, or by a mixture of 285 g. of dimethyl formamide and 15 g. of pyridine, and if otherwise the procedure remains the same as set forth in Examples 12–14, except regarding the temperature, the rate of reaction is reduced, as expected. In the former case, conversions of about 30% are obtained at reaction temperatures in the order of 100° C. The yields of acrylic acid ethyl ester, calculated on said conversion, are always in excess of 90%.

In the second case, the conversion at 150° C. is increased to 55%; the respective yields are about 93%.

*Example 16*

Preparation of acrylic acid butyl ester.

The same apparatus and procedure as set forth in Examples 12 to 14 was employed for the decarboxylation of a 1 molar monobutyl maleate solution of the following composition:

82.6% monobutyl maleate, 5.8% (=0.16 mole) n-butanol, and 11.6% acrylic acid butyl ester (14%, calculated on 100% monobutyl maleate). From the $CO_2$ amount of 41.8 g., a conversion of 95% is calculated. There were obtained 131 g. of acrylic acid butyl ester, corresponding to a yield of 86%, calculated on the monobutyl maleate. The loss of 14% of acrylate is substantially due to polymerization reactions.

I claim:

1. A process for the preparation of acrylic acid esters comprising decarboxylating a mono copper salt of a 1,2-ethylenedicarboxylic acid half ester wherein the ester radical is derived from an alcohol having 1 to 10 carbon atoms and the acid radical is derived from a member of the group consisting of maleic acid and fumaric acid at a temperature in the range of 100 to 290° C. in the presence of a member of the group consisting of pyridine, quinoline, and acridines.

2. The process as claimed in claim 1 wherein the decarboxylation is carried out in an inert solvent which is miscible with said heterocyclic compound.

3. The process as claimed in claim 1 comprising carrying out said decarboxylation in the additional presence of 2 to 65 parts by weight, calculated on 100 parts of said half ester, of an acrylic acid ester, and of 0.01 to 2 moles, calculated on 1 mole of said half ester, of an alcohol.

4. The process as claimed in claim 3 wherein 5 to 25 parts by weight of said acrylic acid ester and 0.02 to 0.5 mole of said alcohol are employed.

5. The process as claimed in claim 3 wherein said acrylic acid ester corresponds to said decarboxylated half ester.

6. The process as claimed in claim 3 wherein said alcohol corresponds to the alcohol forming said half ester.

7. The process as claimed in claim 3 including the step of adding said acrylic acid ester and alcohol in the preparation of said half ester.

8. The process as claimed in claim 1 wherein the reaction is carried out in the presence of a polymerization inhibitor which is non-volatile under the reaction conditions.

9. The process as claimed in claim 1 wherein the reaction is carried out in the presence of a polymerization inhibitor which is volatile under the reaction conditions.

10. The process as claimed in claim 1 wherein the reaction is carried out in the presence of a compound of alkaline reaction in water.

References Cited

UNITED STATES PATENTS 3,036,119  5/1962  Koch et al. _____ 260—486
3,238,239  3/1966  Schweckendiek __ 260—486 XR

OTHER REFERENCES

Fieser et al., "Advanced Organic Chemistry," p. 119 (1961).

LORRAINE A. WEINBERGER, *Primary Examiner.*

A. P. HALLUIN, *Assistant Examiner.*